Jan. 18, 1966  C. S. DRAPER ETAL  3,229,533
GYROSCOPIC APPARATUS AND THE ART OF EMPLOYING SAME
Filed Nov. 21, 1960  4 Sheets-Sheet 2
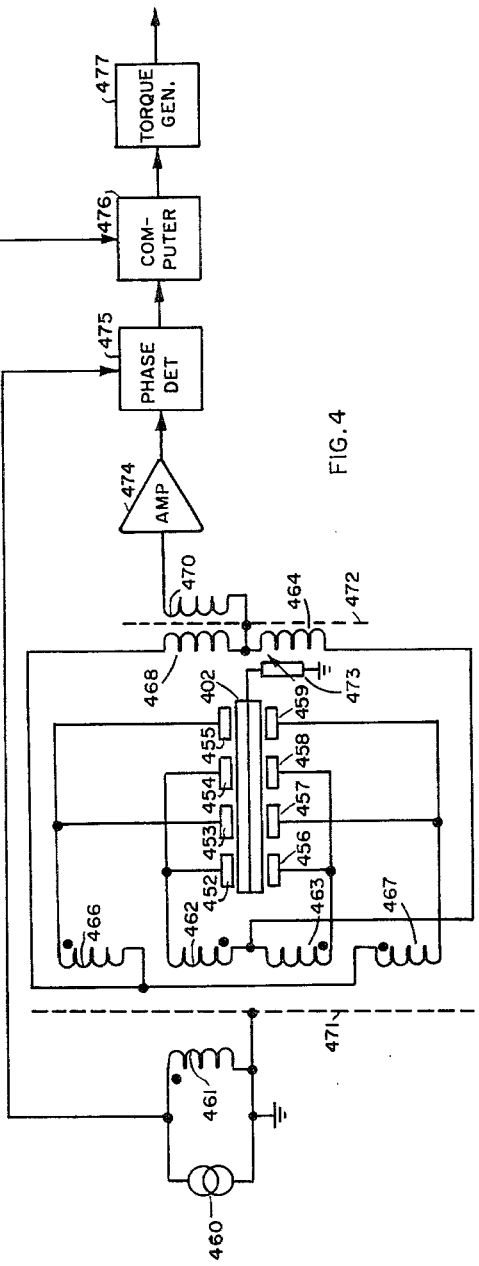
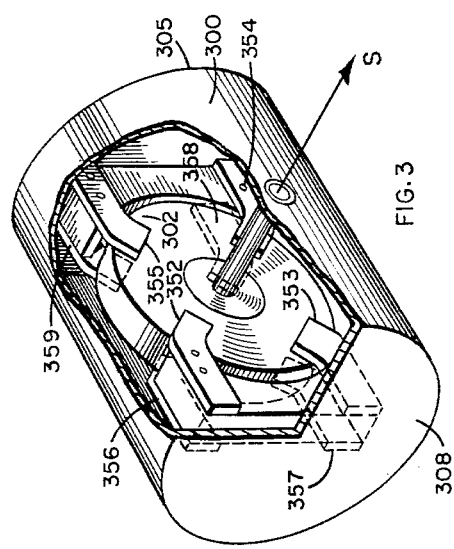
INVENTORS
CHARLES STARK DRAPER
AND
ERNEST BLANEY DANE, JR.
BY Jack Larsen
ATTORNEY INVENTORS
CHARLES STARK DRAPER
AND
ERNEST BLANEY DANE, JR.
BY Jack Larsen
ATTORNEY Jan. 18, 1966    C. S. DRAPER ETAL    3,229,533
GYROSCOPIC APPARATUS AND THE ART OF EMPLOYING SAME
Filed Nov. 21, 1960    4 Sheets-Sheet 4

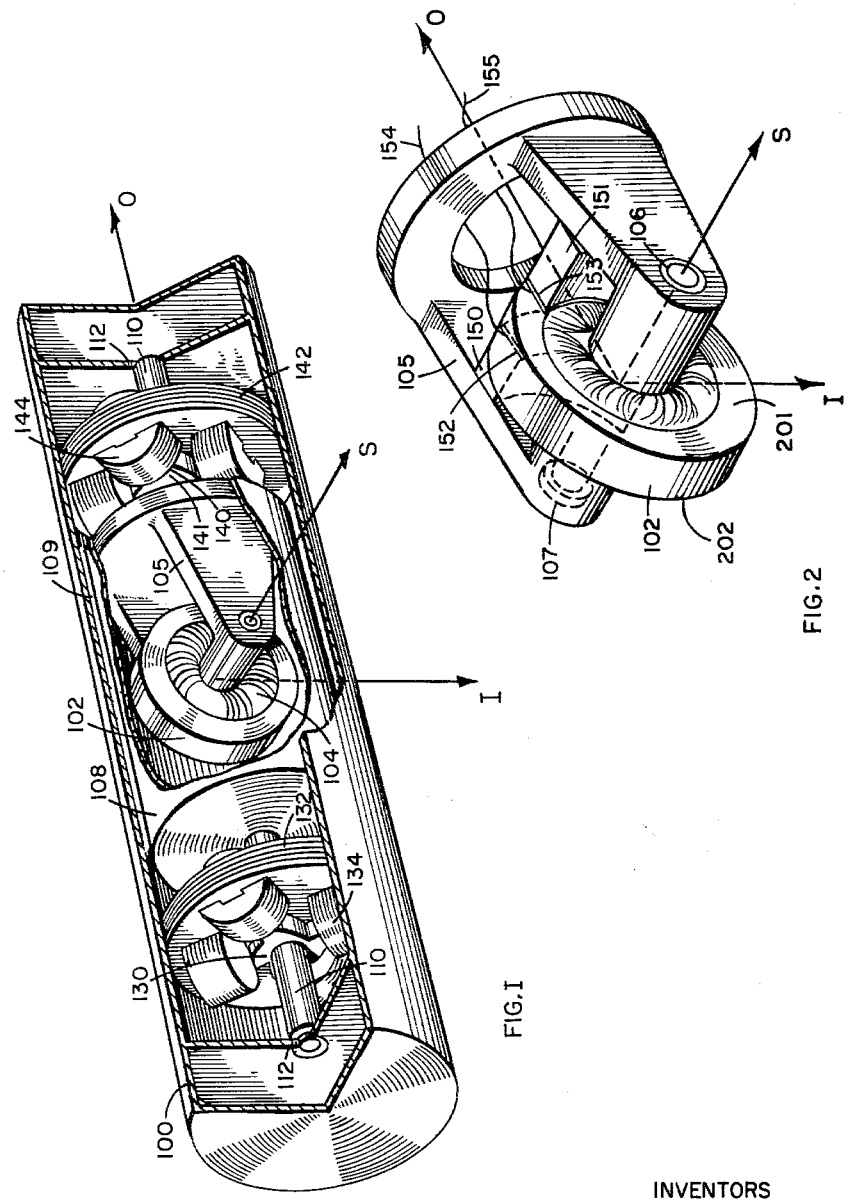

INVENTORS
CHARLES STARK DRAPER
AND
ERNEST BLANEY DANE, JR.
BY Jack Lursen
ATTORNEY 3,229,533
GYROSCOPIC APPARATUS AND THE ART OF
EMPLOYING SAME
Charles S. Draper, Newton, and Ernest B. Dane, Jr.,
Belmont, Mass., assignors to Massachusetts Institute of
Technology, Cambridge, Mass., a corporation of
Massachusetts
Filed Nov. 21, 1960, Ser. No. 70,698
8 Claims. (Cl. 74—5.4)

This invention relates to gyroscopes, particularly to precision gyroscopes intended for use in navigation and guidance systems, and more particularly to the spin axis bearings thereof and to means for compensating for compliance therein. This invention is applicable to spin axis bearings of any type such as pressurized fluid bearings and ball bearings. It is particularly appropriate to gyroscopes using ball bearings. There is a similarity in the function of spin axis bearings in all successful precision gyroscopes in that there is a film of fluid which separates the moving parts. This is as true for rolling contact bearings as for gas or liquid lubricated journal types. Thickness of the film in the bearing affects the axial position of the wheel and therefore the balance of the suspension. Both will change whenever the film in one bearing changes with respect to the other. Radial shifts are generally much smaller because of the rapid rotation. Usually they are completely negligible. Unfortunately the thickness of the films is not a linear function of acceleration applied to the gyro as a whole. In both ball and fluid lubricated types two other effects appear. For pure linear accelerations, powers higher than the square are significant in governing the yield and furthermore spontaneous changes occur. The latter are the more important as a rule. In ball bearings these spontaneous shifts appear to be due to the sudden motion of oil drops, while in air bearings a still larger shift may occur due to the negative temperature coefficient of viscosity and the relatively large amounts of power which are used. Heretofore the elimination of these spontaneous changes in ball bearings has required stringent quality control and the selection of only the best bearings produced by the best manufacturers and operating these selected bearings with so little lubricating oil that the life of the bearing may be impaired. It is an object of this invention to provide means for compensating for spontaneous shifts of the gyro rotor so that less stringently selected bearings may be used and so that bearings may be operated with sufficient lubricating oil to assure long life. It is a further object of this invention to compensate for non-linear compliance in the spin axis bearings of a gyroscope. Further objectives of the invention are to provide for gyroscopic systems which are more easily produced, less expensive, and more reliable. Other objectives of this invention will be apprehended from the following specification and drawings of which:

FIG. 1 is a cut-away view of a floated single degree-of-freedom gyroscope as disclosed in Patent 2,752,791, July 3, 1956 to which the present invention is applicable.

FIG. 2 is a simplified detail of the gyro rotor support structure of FIG. 1 showing the modifications required in accordance with the present invention.

FIG. 3 represents a preferred embodiment of the support structure as required for this invention.

FIG. 4 is a schematic diagram of an electrical system appropriate to the practice of the invention.

Figure 5:
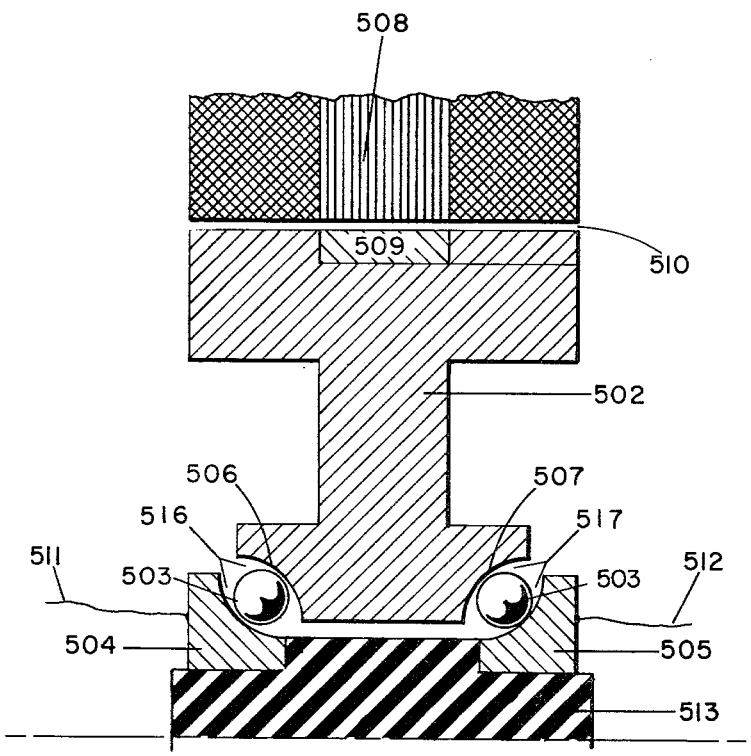
FIG. 5 is basically a half section of a gyro wheel and bearings adapted for the practice of the invention in an alternate manner.

The gyroscope illustrated in FIG. 1 is a single-degree-of-freedom gyro comprising a case 100, and a gyro rotor 102 which together with a stator 104 constitute a synchronous motor to drive the rotor at a high constant speed about the spin axis designated S. The rotor is mounted in a frame 105 attached to a shaft 110, the axis of which is the output axis O of the gyro. The gyro rotor stator assembly is enclosed in an inner cylindrical float casing 108 also rigidly attached to the shaft 110. Between the casing 108 and the outer case or mount 100 there is a small clearance space 109. This space is filled with a high-density high-viscosity fluid to provide flotation and damping means for the casing. The ends of the shaft 110 are journaled in bearings 112 fixed in the case 100. Mounted on the shaft 110 is the signal generator rotor 130. The signal generator is preferably a microsyn as described in Mueller Patent 2,488,734 issued November 22, 1949. The signal generator comprises a rotor 130 and stator 132. A reference voltage activates the stator windings 134 and an output voltage is read out of them. The output voltage is proportional to the angle of the rotor from its neutral position with respect to the stator. The rotor 130 is connected to the support member 105 and casing 108 by the shaft 110. The stator 132 is connected to the mount member or case 100. Also provided at one end of the shaft 110 is the torque generator 140. The torque generator is of the type described in the above mentioned Mueller patent. It comprises a rotor 141, a stator 142, and stator windings 144. Its property is that it generates torque between the rotor and stator proportional to the current input to the windings. Since the stator 142 and its windings 144 are mounted on the case or mount member 100, a torque is generated tending to rotate the support member, the shaft 110, and the gyro frame 105 relative to the case 100. In the normal mode of operation of such a gyroscope rotation of the case 100 about the input axis I produces a rotation of the shaft 110 about the output axis O; the electrical output of the gyro in the form of a voltage across the output windings of the signal generator is amplified and the amplified current is applied to the base motion isolating system to restore the case 100 to the null position indicated by the shaft 110.

FIG. 2 is an enlarged cut-away view of the support and rotor structure of FIG. 1, modified in accordance with the present invention by the addition of insulating blocks 150 and 151 rigidly affixed to the frame 105. The electrodes 152 and 153 are sputtered or plated to the surfaces of the blocks 150 and 151 in close proximity to the rim surfaces 201 and 202 of the gyro rotor 102. The surfaces 201 and 202 at opposite ends of the rotor for optimum performance should be substantially equal in area and perpendicular to the spin axis. The surfaces may be plane or any other convenient surface of revolution about the spin axis. The electrodes are connected by wires 154 and 155 to external circuitry not shown. These wires together with the power leads for the gyro motor are connected to external apparatus through flexible leads of special construction between the float and the case portions. The rotor 102 is supported by spin axis bearings 106 and 107. As a result of irregularities in lubrication and other effects, as discussed above, the rotor 102 may be displaced in the direction of the spin axis. A displacement of the rotor in the positive direction of the spin axis causes unbalance such that a torque is applied on the output axis of the gyro when acceleration or gravity acts along the input axis. In accordance with the present invention, the electrodes 152 and 153 with the rotor 102 comprise a differential capacitor. With a shift of the rotor in the direction of the spin axis the capacitance between electrode 153 and rotor 102 is increased while the capacitance between electrode 152 and the rotor 102 is decreased. By means of appropriate bridge circuitry, amplifiers, and detectors, as is well known in the art, an electrical correction signal may be generated as a result of the differential change in capacitance and this electrical signal may be applied to the output axis of the gyroscope to overcome the effect of the spurious torques on the input axis. In an actual gyroscope, the motion of the gyro rotor may not comprise a simple translation along the spin axis. Accordingly a more complex arrangement of electrodes such as illustrated in FIG. 3 is preferred. In practice, also, the frame 105 and the casing 108 are integrated into a float body 300 and end bells 305 and 308. A total of 8 electrodes numbered 352, 353, 354, 355, 356, 357, 358, and 359 are arranged in proximity to the rotor located on opposite sides of the rotor and at opposite ends of mutually perpendicular diameters of the rotor. The polarity of adjacent electrodes is opposite whereby an electrical signal may be generated in a circuit as shown in FIG. 4 which is a measure of displacement of the rotor 302 along the spin axis S independent of twisting of the rotor 302. This arrangement of electrodes tends to maintain the rotor at ground potential and to minimize the influence of imperfect ground connections through the bearings. In FIG. 4 the electrodes 352 through 359 of FIG. 3 are represented by the capacitative elements 452, 453, 454, 455, 456, 457, 458, 459, and the rotor 302 is represented by the central capacitative element 402 which is maintained at ground potential. A shift of the rotor 302 in the direction of the spin axis results in a reduction in the capacitance between elements 452, 453, 454, 455, relative to the central element 402 and the capacitances between electrode elements 456, 457, 458, 459 are increased. A generator 460 of high frequency alternating current and a primary winding 461 apply excitation through secondary windings 462, 463 which, with pickup winding or detector winding 464 and the capacitances associated with elements 452, 454, 456, and 458 comprise a bridge circuit. A similar but oppositely phased bridge circuit is formed by windings 466, 467 and detector winding 468 and the capacitances associated with elements 453, 455, 457, and 459. The resulting alternating signal induced in secondary winding 470 is a measure of the average net displacement of the rotor along the spin axis, substantially independent of any tilt or wobble. Electrostatic shields 471, 472 are provided in the transformers in accordance with the recognized design principles. The ground return of the rotor through the bearings is indicated as a variable impedance in the block 473. The displacement signal is amplified by the amplifier 474, and, in the phase detector 475, converted to a direct current of positive or negative polarity depending upon phase. This current is applied to a computer 476 which multiplies it by a component of specific force as measured by accelerometers and modifies it so that when the result is fed back to the torque generator 477 of the gyro the output torque just cancels the torque resulting from the unbalance of the rotor 302. The torque generator 477 represents an electromechanical device such as the microsyn torque generator 140 applied to the shaft 110 in FIG. 1.

Figure 6:
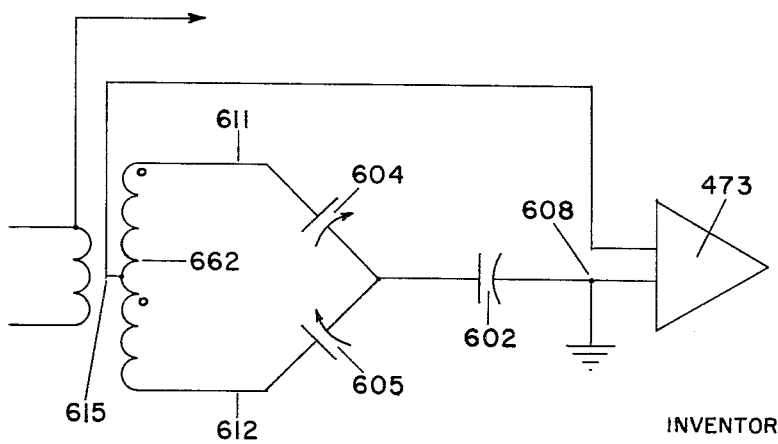
FIG. 6 is an electrical schematic of the embodiment of FIG. 5.

FIGS. 5 and 6 illustrate an alternate arrangement of the invention. A rotor 502 is supported on a fixed axle 513 by ball bearings comprising balls 503, and fixed races 504 and 505 together with races 506 and 507 which are a part of the rotor 502. The wheel is driven by a hysteresis synchronous motor comprising field laminations 508 and permanently magnetic hysteresis ring 509. In this arrangement the races 504 and 505 are insulated from each other and from ground. They are connected to external circuitry by wires 511 and 512. For convenience insulation is illustrated by indicating the axle 513 to be of non-conducting composition throughout. An alternative structure employing a system of insulating sleeves and washers on a metallic axle might be preferred to provide mechanical support and electrical isolation for the races 504 and 505. The capacitances between the races 504 and 505 and the rotor change differentially as a result of small shifts of the rotor along its axis because of changes in the thickness of the oil films 516 and 517. The capacitances of the bearings are, therefore a measure of rotor position.

To compare the capacitance between the race 504 and the rotor 502 relative to the capacitance between the race 505 and the rotor 502 requires a third electrical connection to the rotor 502. This is provided principally in the capacitance between the hysteresis ring 509 and the stator 508. For good sensitivity, the capacitance between rotor and stator should be at least of the same order of magnitude as the capacitance across the bearings. This requires the spacing 510 between rotor and stator to be very close, closer than required for motor performance alone.

Circuitry for developing an error signal from the changing capacitances is well known in the art. FIG. 6 indicates the modifications in the basic circuitry of FIG. 4 to utilize signals developed across the bearings. A high frequency alternating current is applied to the bridge transformer primary as in FIG. 4 and the error signal amplified in amplifier 474, detected and fed back as described above in connection with FIG. 4. In FIG. 6 the capacitances 602, 604, and 605, represent the capacitances between the rotor 502 and the stator and the rotor and the two races 504 and 505 respectively. The error signal is taken between the center tap 615 of the winding 662 and the stator 608 which is at ground potential. The geometry of the contact between balls and races is such that the error signal is a decidedly non-linear function of rotor position. Accordingly the linearizing network 476 becomes in this case an especially vital part of the system.

Gyroscopes of such precision that corrections of the kind contemplated by this invention may profitably be employed must ordinarily be protected from excessive angular rates by base motion isolation, usually involving a system of three or more gimbals.

Figure 7:
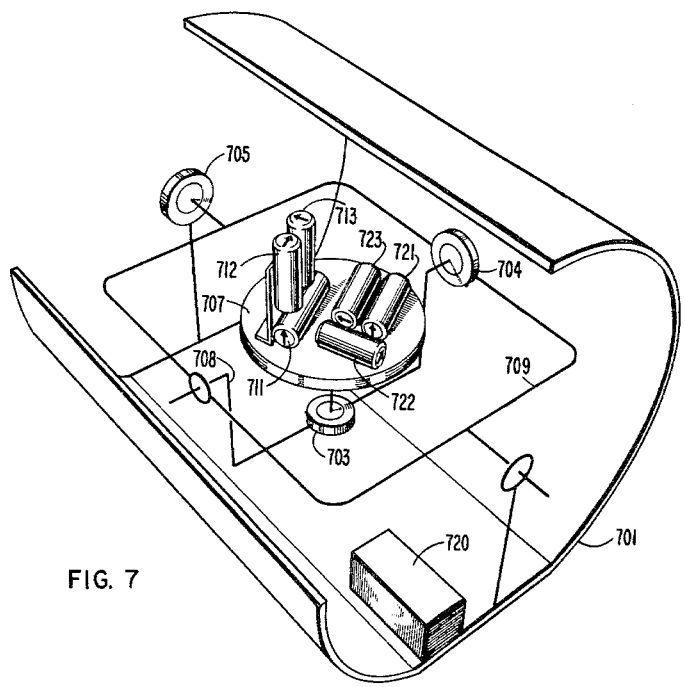
FIG. 7 is a line schematic of an inertial platform, and base motion isolation system.

In FIG. 7 the base 701 is represented as part of a missile body. Power drives 703, 704, and 705, maintain the orientation of the stable platform 707 through the gimbals 708 and 709 regardless of the heading, pitch and roll of the missile.

The stable table 707 carries three gyroscopes, an azimuth gyro 711, and leveling gyros 712, and 713 having mutually perpendicular input axes. It also carries accelerometers 721, 722, and 723 also having a set of mutually perpendicular sensitive axes. With this arrangement, the power drive 703 responds mainly to the error signal developed in the azimuth gyro alone but the pitch drive 704 and the roll drive 705 respond to all three gyros 711, 712, 713 in amounts which depend upon the gimbal angles. Accordingly electrical means are required for measuring the gimbal angles. Usually these are resolvers which generate signals proportional to sines and cosines of the angles. These resolvers are included in the power drive units 703, 704, and 705 for purposes of illustration. Also required and not shown are slip rings or cable twists by which the various required electrical connections are made between the power drives, the stable table, and electronic circuitry 720 located on the base 701. This circuitry may be mainly digital, mainly analog, or a combination of both as is well known in the art. This circuitry solves the geometrical problem to provide the appropriate commands to the power drives to maintain the level orientation of the table 707 and to compute and generate appropriate gyro-compensating signals in accordance with the system diagrams FIG. 4 and FIG. 8.

Figure 8:
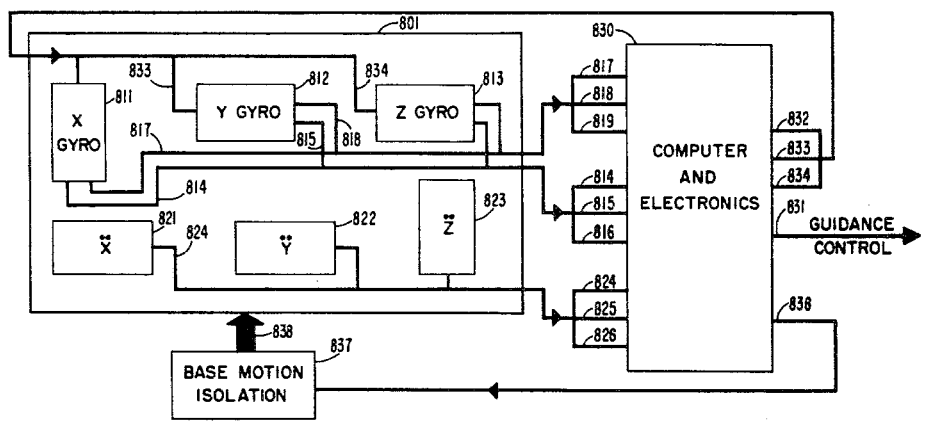
FIG. 8 is a block diagram illustrating the use of the invention with an inertial platform and base motion isolating system.

FIG. 8 is a single line block diagram of a typical guidance system as illustrated by FIG. 7. A stable table 801 carries an "X" gyro 811, a "Y" gyro 812 and a "Z" gyro 813. The input axes of these gyros are a set of orthogonal axes X, Y, and Z. These axes may be oriented in any convenient direction, for example the X axis may be vertical and Y and Z horizontal as in the previous example. The table also carries three accelerometers, an "X" accelerometer, a "Y" accelerometer, and a "Z" accelerometer. These accelerometers conveniently are oriented for sensitivity along the same three axes as the gyroscopes, but may be otherwise oriented as desired. The gyroscopes in accordance with the present invention generate two output signals, the normal signal generator output indicating float rotation as a measure of input angular rate, and the output of the proximity circuit which measures the shift of the gyro wheel along the spin axis.

The block diagram indicates the angular rate signal transmitted on paths 814, 815, and 816 and the proximity signals on paths 817, 818, and 819. These signals with the accelerometer signals on paths 824, 825, and 826 are processed by the computer and electronic package 830.

The electronic package 830 generates guidance and control signals which are delivered by path 831 to other equipment not important for the understanding of this invention. It also generates correction signals for the gyroscopes based upon measurements of gyro wheel shift and acceleration. These signals are fed back on paths 832, 833, and 834, to the X gyro 811, the Y gyro 812, and the Z gyro 813 respectively.

An example of the required calculation is as follows:

$$S_{cx} = (k_1 + S_{px} k_2) \ddot{X}$$

Where $S_{cx}$ is the correction signal applied on path 832 to the output axis of "X" gyro 811, $S_{px}$ is the proximity signal on path 817 which is a measure of the shift of the X gyro wheel along its spin axis. $\ddot{X}$ is the output signal of the "X" accelerometer 821 on path 824, $k_1$ is a proportionality term related to the residual pendulosity of the float when the wheel is centered and $k_2$ is a proportionality term related to the change in pendulosity with wheel motion. In practice the constants $k_1$ and $k_2$ may be combined by shifting the null point of the capacitance bridge which produces the proximity signal.

In addition, the computer transmits signals along path 836 to the base motion isolation system 837. By mechanical means indicated by the heavy arrow 838 the position of the table 801 is stabilized.

It should be pointed out that the apparatus taught by the present invention is general in nature and is not limited to compensation of single-degree-of-freedom gyroscopes but may be applied to two degree of freedom instruments. It is also applicable to so-called "strap down" systems where gimbals are eliminated and the gyros are fastened directly to the vehicle body. Further, the choice of capacitative indication of proximity appears to provide a more rigid structure; but magnetic devices may also be used to detect the motion of the rotor along the spin axis, the resulting electrical signals being employed in the manner described.

Having thus described the invention, what is claimed is:

1. In systems employing a gyroscope of the type wherein a spin axis bearing supports a rotor on a frame, the art of compensating for the unbalance torque on said frame resulting from a shift in the displacement of said rotor relative to said frame which comprises the following steps:
    (a) measuring said displacement,
    (b) measuring applied specific force, and
    (c) applying to said frame in opposition to said torque a compensating torque proportional to both said displacement and said force.

2. A single-degree-of-freedom gyroscopic unit
    (1) comprising
        (a) a case,
        (b) a gyro rotor,
        (c) means for spinning the gyro rotor about an axis denoted the spin axis,
        (d) a frame in which the gyro rotor spins,
        (e) a chamber containing the gyro rotor and frame,
        (f) a shaft and bearings for mounting the chamber in the case rotatable about an axis perpendicular to the spin axis,
        (g) a signal generator comprising a second rotor connected to the chamber and a first stator mounted on the case arranged to produce a signal dependent on the position of said second rotor with respect to said stator,
        (h) a torque generator comprising a third rotor connected to the chamber and a second stator mounted on the case,
        (i) said torque generator being responsive to an electric input to produce a torque tending to rotate said third rotor with respect to said second stator, and
        (j) means for applying an electric input to the torque generator;
    (2) characterized in that said gyro rotor is supported on a ball bearing comprising
        (a) a rotatable race fixed to said gyro rotor,
        (b) a fixed race,
        (c) a plurality of balls, of a size to fit between said races,
        (d) a quantity of electrically non-conducting liquid forming films between said balls and said races, and
        (e) means of electrically non-conducting composition for support of said fixed race on said frame.

3. In systems employing a floated single-degree-of-freedom gyroscope of the type described, having a float constrained to rotate about an output axis, a torque generator for applying a torque to said float on said axis, and a rotor within said float mounted on bearings to spin about a spin axis perpendicular to said output axis the method which comprises the step of
    (a) measuring the displacement of said rotor along said spin axis, and
    (b) feeding back to said torque generator an appropriate signal proportional to said displacement.

4. A single-degree-of-freedom gyroscopic unit comprising a case, a gyro rotor, means for spinning the gyro rotor about an axis denoted the spin axis, a frame in which the gyro rotor spins, a chamber containing the gyro rotor and frame, shaped to form a small clearance space between the chamber and the case, a shaft and bearings for mounting the chamber in the case rotatable about an axis denoted the output axis perpendicular to the spin axis, viscous fluid filling the case and clearance space and surrounding the chamber, said fluid being of sufficient density so that the weight load on the bearings is substantially eliminated and of sufficient viscosity to act as a damping medium, said clearance space being sufficiently small so that the viscous damping torque is substantially greater than the inertia reaction torques or friction torques associated with deflections of the gyroscope, temperature controlling means for maintaining the temperature of the fluid at a value substantially constant, a signal generator comprising a second rotor connected to the chamber and a first stator mounted on the case arranged to produce a signal dependent on the position of said second rotor with respect to said first stator, a torque generator comprising a third rotor connected to the chamber and a second stator mounted on the case, said torque generator being responsive to an electric input to produce a torque tending to rotate said third rotor with respect to said second stator, and means for applying an electric input to the torque generator in further combination with (a) means for measuring the displacement of said gyro rotor with respect to said frame,
(b) means for measuring a component of applied specific force,
(c) means for generating a compensating electric input proportional to both said displacement and said component, and
(d) means for applying said compensating input to said torque generator.

5. A single-degree-of-freedom gyroscopic unit
   (1) comprising
       (a) a case,
       (b) a gyro rotor,
       (c) means for spinning the gyro rotor about an axis denoted the spin axis,
       (d) a frame in which the gyro rotor spins,
       (e) a chamber containing the gyro rotor and frame, shaped to form a small clearance space between the chamber and the case,
       (f) a shaft and
       (g) bearings for mounting the chamber in the case rotatable about a second axis denoted the output axis perpendicular to the spin axis,
       (h) a viscous fluid filling the case and clearance space and surrounding the chamber, said fluid being of sufficient density so that the weight load on the bearings is substantially eliminated and of sufficient viscosity to act as a damping medium, said clearance space being sufficiently small so that the viscous damping torque is substantially greater than the inertia reaction torques or friction torques associated with deflections of the gyroscope,
       (i) temperature controlling means for maintaining the temperature of the fluid at a value substantially constant,
       (j) a signal generator comprising a second rotor connected to the chamber and a first stator mounted on the case arranged to produce a signal dependent on the position of said second rotor with respect to said first stator,
       (k) a torque generator comprising a third rotor connected to the chamber and a second stator mounted on the case, said torque generator being responsive to an electric input to produce a torque tending to rotate said third rotor with respect to said second stator, and
       (l) means for applying an electric input to the torque generator;
   (2) characterized in that said rotor is mounted in said frame on spin axis bearings of a kind wherein there is a film of fluid which separates the moving parts,
   (3) in further combination with
       (a) means for generating a second signal which is dependent on the axial displacement of said rotor relative to said frame,
       (b) means for generating other electrical signals which define the magnitude of applied specific force and its direction relative to said axis,
       (c) means for utilizing said second signal and said other signals to generate a compensating current and
       (d) means for applying said compensation current as an electric input to said torque generator.

6. For compensating a precision gyroscope of the kind which comprises a frame constrained to rotate only about an output axis, a rotor mounted in said frame on bearings fixed to said frame and situated to constrain the rotation of said rotor to an axis substantially perpendicular to said output axis said bearing being of a kind wherein there is a film of fluid which separates the moving parts, the combination which comprises
   (a) means for generating a direct measure of the axial displacement of said rotor relative to said frame,
   (b) means for generating the product of said measure multiplied by a component of applied specific force, and
   (c) means for utilizing said product for applying a torque to said frame about said output axis to counteract and equalize the pendulosity resulting from said displacement.

7. For compensating a precision gyroscope of the kind which comprises a frame rotatable about an output axis, a rotor mounted in said frame on bearings fastened to said frame said bearings being situated to constrain the rotation of said rotor to a spin axis substantially perpendicular to said output axis by a film of fluid which separates the moving parts, the method which comprises the steps of
   (a) measuring the displacement of said rotor along said spin axis relative to said frame,
   (b) measuring the applied specific force vector and
   (c) applying a torque to said frame about said output axis which is proportional to both said displacement and to a component of said force to counteract and equalize the pendulosity resulting from said displacement.

8. The combination as defined by claim 2
   (3) in further combination with
       (a) means for developing an error signal which depends on the capacitance between said fixed race and said rotatable race,
       (b) means for developing other signals which depend upon applied specific force,
       (c) means for utilizing said error signal and said other signals to generate a compensation current which is proportional to both the displacement of said gyro rotor with respect to said frame and to a component of said force, and
       (d) means for applying said current as an electric input to said torque generator.

References Cited by the Examiner
UNITED STATES PATENTS

| | | | |
|---|---|---|---|
| 2,606,310 | 8/1952 | Baker | 318—31 |
| 2,752,792 | 7/1956 | Draper et al. | 74—5.34 |
| 2,852,208 | 9/1958 | Schlesman | 244—14 |
| 2,857,767 | 10/1958 | Werndl | 74—5.37 |
| 2,903,891 | 9/1959 | Sedfield et al. | 74—5.4 |
| 2,925,590 | 2/1960 | Boltinghouse et al. | 74—5.6 X |
| 3,003,356 | 10/1961 | Nordsieck | 74—5 |

BROUGHTON G. DURHAM, *Primary Examiner.*

ARTHUR M. HORTON, SAMUEL FEINBERG,
*Examiners.*

R. F. STAHL, T. W. SHEAR, *Assistant Examiners.*